US012742028B2

(12) United States Patent
Shibasaki et al.

(10) Patent No.: US 12,742,028 B2
(45) Date of Patent: Sep. 22, 2026

(54) COPOLYMER, COMPOSITION, MOLDED PRODUCT AND COATED ELECTRICAL WIRE

(71) Applicant: AGC Inc., Tokyo (JP)

(72) Inventors: Kosuke Shibasaki, Tokyo (JP); Shuma Kawanami, Tokyo (JP); Daisuke Taguchi, Tokyo (JP); Shintaro Fukunaga, Tokyo (JP); Mie Takayama, Tokyo (JP); Kazuhiro Nakabayashi, Tokyo (JP)

(73) Assignee: AGC Inc., Tokyo (JP)

( * ) Notice: Subject to any disclaimer, the term of this patent is extended or adjusted under 35 U.S.C. 154(b) by 565 days.

(21) Appl. No.: 18/366,743

(22) Filed: Aug. 8, 2023

(65) Prior Publication Data

US 2023/0391934 A1 Dec. 7, 2023

Related U.S. Application Data

(63) Continuation of application No. PCT/JP2022/005103, filed on Feb. 9, 2022.

(30) Foreign Application Priority Data

Feb. 12, 2021 (JP) ................................ 2021-020979

(51) Int. Cl.

*C08L 27/18* (2006.01)
*C08F 214/26* (2006.01)
*C08K 3/08* (2006.01)
*H01B 3/44* (2006.01)
*C08K 3/22* (2006.01)

(52) U.S. Cl.

CPC ............ *C08F 214/265* (2013.01); *C08K 3/08* (2013.01); *H01B 3/445* (2013.01); *C08F 214/262* (2013.01); *C08F 2500/12* (2013.01); *C08F 2500/27* (2021.01); *C08K 2003/085* (2013.01); *C08K 2003/2248* (2013.01); *C08K 2201/012* (2013.01); *C08L 27/18* (2013.01)

(58) Field of Classification Search

CPC .............. C08F 214/265; C08F 214/262; C08F 214/182; C08F 214/186; C08F 2500/12; C08F 2500/27; C08F 2800/10; C08L 27/18; C08L 2203/202; C08K 3/014; C08K 2003/2248; H01B 3/445

See application file for complete search history.

(56) References Cited

U.S. PATENT DOCUMENTS 4,123,602 A * 10/1978 Ukihashi ............ C08F 214/265 526/253
4,166,165 A * 8/1979 Hisasue ................ C08F 210/02 526/87
4,513,129 A * 4/1985 Nakagawa ........... C08F 210/02 526/245
4,521,575 A * 6/1985 Nakagawa ............ C08F 210/02 526/253
4,629,756 A 12/1986 Kerbow
4,678,847 A * 7/1987 Zhang ................ C08F 214/265 526/206
6,455,658 B1 * 9/2002 Okanishi .................... C08J 5/18 526/253
8,829,132 B2 * 9/2014 Taguchi ................ C08F 214/26 526/253
10,882,936 B2 * 1/2021 Aida ....................... C08L 27/18
11,548,960 B2 * 1/2023 Yano ...................... H01B 3/441
2007/0149734 A1 6/2007 Sakakibara et al.
2012/0037398 A1 † 2/2012 Hirao
2016/0064115 A1 * 3/2016 Terada ................ C08F 214/265 428/379
2016/0189985 A1 6/2016 Kasai et al.
2017/0088651 A1 * 3/2017 Aida ......................... C08F 2/38
2018/0237566 A1 8/2018 Aida et al.

(Continued)

FOREIGN PATENT DOCUMENTS

CN 119613597 A * 3/2025 ............. H01B 3/445
GB 1292643 † 10/1972
JP 47-23671 B1 7/1972

(Continued)

OTHER PUBLICATIONS

D'Aniello et al., "Influence of constitutional defects on polymorphic behavior and properties of alternating ethylene-tetrafluoroethylene copolymer", Polymer, vol. 36, No. 5, Dec. 31, 11995, pp. 967-973.
Funaki et al., "Influence of third monomer on the crystal phase transition behavior of ethylene-tetrafluoroethylene copolymer", Polymer, vol. 49, No. 25, Nov. 24, 2008, pp. 5497-5503.
International Search Report issued Apr. 19, 2022 in PCT/JP2022/005103 filed on Feb. 9, 2022 2 pages.
European Communication pursuant to Rule 114(2) EPC issued Nov. 14, 2025, in corresponding European Patent Application No. 22752776.9, 8 pages.

(Continued)

*Primary Examiner* — Rip A Lee

(74) *Attorney, Agent, or Firm* — Oblon, McClelland, Maier & Neustadt, L.L.P.

(57) ABSTRACT

To provide a copolymer capable of forming a coated electrical wire excellent in engine oil resistance, a composition, a molded product, and a coated electrical wire. The copolymer of the present invention is a copolymer comprising units based on ethylene, units based on tetrafluoroethylene, and units based on compound A represented by $CH_2{=}CX(CF_2)_nY$ (wherein X and Y are each independently a hydrogen atom or a fluorine atom, and n is an integer of from 2 to 6) or compound B represented by $CF_2{=}CF{-}O{-}C_3F_7$, wherein the crystal lamella thickness determined by the small angle X-ray scattering method is at most 4.0 nm and the melting point is at least 245° C.

16 Claims, 3 Drawing Sheets

(56) References Cited

U.S. PATENT DOCUMENTS

2020/0362077 A1 † 11/2020 Yano

FOREIGN PATENT DOCUMENTS

| | | | | | |
|---|---|---|---|---|---|
| JP | 6-211933 | A | | 8/1994 | |
| JP | 2013115059 | A | * | 6/2013 | |
| JP | 2013237730 | A | * | 11/2013 | |
| JP | 2018-145209 | A | | 9/2018 | |
| WO | WO-2013062092 | A1 | * | 5/2013 | ............ C08F 210/02 |
| WO | WO 2017/082417 | A1 | | 5/2017 | |

OTHER PUBLICATIONS

Muhammad Abdullah Al Mamun et al., “Flexible transparent fluorinated nanohybrid with innovative heat-resistance property—new technology proposal for fabrication of transparent materials using “crystalline” polymer”, Journal of Polymer Science, vol. 53, issue 23, Dec. 1, 2015, pp. 1674-1690.

* cited by examiner
† cited by third party

COPOLYMER, COMPOSITION, MOLDED PRODUCT AND COATED ELECTRICAL WIRE

TECHNICAL FIELD

The present invention relates to a copolymer, a composition, a molded product and a coated electrical wire.

BACKGROUND ART

An ethylene/tetrafluoroethylene copolymer (hereinafter referred to also as "ETFE") has such characteristics that it is excellent in heat resistance, weather resistance, electrical insulation, non-adhesiveness, and water and oil repellency, as well as it has high moldability and mechanical strength among fluororesins. Therefore, a variety of molded products such as electrical wire sheathing, tubes, sheets, films, filaments, pump casings, fittings, packings, linings, and coatings, are produced by melt molding methods such as extrusion molding, blow molding, injection molding and rotational molding.

For example, Patent Document 1 discloses a composition comprising a copolymer having units based on ethylene, units based on tetrafluoroethylene and units based on other monomers, and copper oxide.

PRIOR ART DOCUMENT

Patent Document

Patent Document 1: JP-A-2018-145209

DISCLOSURE OF INVENTION

Technical Problem

A coated electrical wire for automobiles has a conductor and a coating layer disposed on the surface of the conductor, and to form the coating layer, a tetrafluoroethylene/hexafluoropropylene copolymer (hereinafter referred to also as "FEP") is widely used. Under these circumstances, the use of ETFE instead of FEP has recently been considered from the viewpoint of reducing the weight of automobiles, etc.

When the present inventors evaluated coated electrical wires having a coating layer formed by using ETFE as described in Patent Document 1, they found that there was room for improvement in engine oil resistance.

Therefore, the present invention is concerned with providing a copolymer capable of forming a coated electrical wire excellent in engine oil resistance, a composition, a molded product and a coated electrical wire.

Solution to Problem

As a result of diligent study of the above problem, the present inventors have discovered that by using a copolymer comprising units based on ethylene, units based on tetrafluoroethylene and units based on the following formula (A) or formula (B), and having a crystal lamella thickness of at most 4.0 nm and a melting point of at least 245° C., it is possible to produce a coated electrical wire excellent in engine oil resistance, and thus, have arrived at the present invention.

That is, the present inventors have found it possible to solve the above problem by the following construction.

[1] A copolymer comprising units based on ethylene, units based on tetrafluoroethylene, and units based on a compound represented by the formula (A) or a compound represented by the formula (B), characterized in that the crystal lamella thickness obtained by the small angle X-ray scattering method is at most 4.0 nm, and the melting point is at least 245° C.:

$$CH_2{=}CX(CF_2)_nY \quad \text{Formula (A)}$$

$$CF_2{=}CF{-}O{-}C_3F_7 \quad \text{Formula (B)}$$

in the formula (A), X and Y are each independently a hydrogen atom or a fluorine atom, and n is an integer of from 2 to 6.

[2] The copolymer according to [1], wherein the M value of the copolymer as determined by the following calculation method is at most 0.20:

Calculation method: The M value is a value calculated by the following formula (1) based on a chart obtained by 400 MHz $^{19}$F-NMR measurement using a melt of the copolymer:

$$M\ \text{value}=C1/B1 \quad \text{Formula (1)}$$

B1: Integral value of peaks observed in the range of chemical shift of from −100 to −115 ppm, C1: Integral value of peaks observed in the range of chemical shift of from −118.5 to −122 ppm, the chemical shifts in said B1 and said C1 are chemical shifts observed when the chemical shift of the peak of $CF_2$ at the position where, at a portion where two consecutive tetrafluoroethylene-based units of the copolymer are continuous, one tetrafluoroethylene-based unit and the other tetrafluoroethylene-based unit are directly bonded, is set to be −120 ppm, provided that said B1 does not include the integral value of peaks observed in the range of chemical shift of from −100 to −115 ppm derived from the compound represented by the formula (A) and the compound represented by the formula (B), and said C1 does not include the integral value of peaks observed in the range of chemical shift of from −118.5 to −122 ppm derived from the compound represented by the formula (A) and the compound represented by the formula (B).

[3] The copolymer according to [1] or [2], wherein the content of the tetrafluoroethylene-based units is from 40 to 65 mol % to all units contained in the copolymer.

[4] The copolymer according to any one of [1] to [3], wherein the content of the ethylene-based units is from 35 to 60 mol % to all units contained in the copolymer.

[5] The copolymer according to any one of [1] to [4], wherein the copolymer is a copolymer containing the units based on ethylene, the units based on tetrafluoroethylene, and the units based on the compound represented by the formula (A).

[6] The copolymer according to any one of [1] to [5], wherein the copolymer contains the units based on the compound represented by the formula (A), and the content of the units based on the compound represented by the formula (A) is from 1 to 5 mol % to all units contained in the copolymer.

[7] The copolymer according to any one of [1] to [4], wherein the copolymer contains the units based on the compound represented by the formula (B), and the content of the units based on the compound represented by the formula (B) is from 1 to 5 mol % to all units contained in the copolymer.

[8] The copolymer according to any one of [1] to [7], wherein the melt flow rate of the copolymer, measured under conditions of a temperature of 297° C. and a load of 49 N in accordance with ASTM D3159, is from 15 to 60 g/10 min.

[9] A composition characterized in that it comprises the copolymer as defined in any one of [1] to [8] and an additive.

[10] The composition according to [9], which contains a heat stabilizer as the additive.

[11] The composition according to [10], wherein the heat stabilizer is a copper compound.

[12] The composition according to any one of [9] to [11], which contains an antioxidant as the additive.

[13] A molded product characterized in that it is obtained by molding the copolymer as defined in any one of [1] to [8] or the composition as defined in any one of [9] to [12].

[14] A coated electrical wire characterized by comprising a conductor and a coating layer disposed on the surface of the conductor and formed from the copolymer as defined in any one of [1] to [8] or the composition as defined in any one of [9] to [12].

Advantageous Effects of Invention

According to the present invention, it is possible to provide a copolymer capable of forming a coated electrical wire excellent in engine oil resistance, a composition, a molded product, and a coated electrical wire.

DESCRIPTION OF EMBODIMENTS

Figure 1:
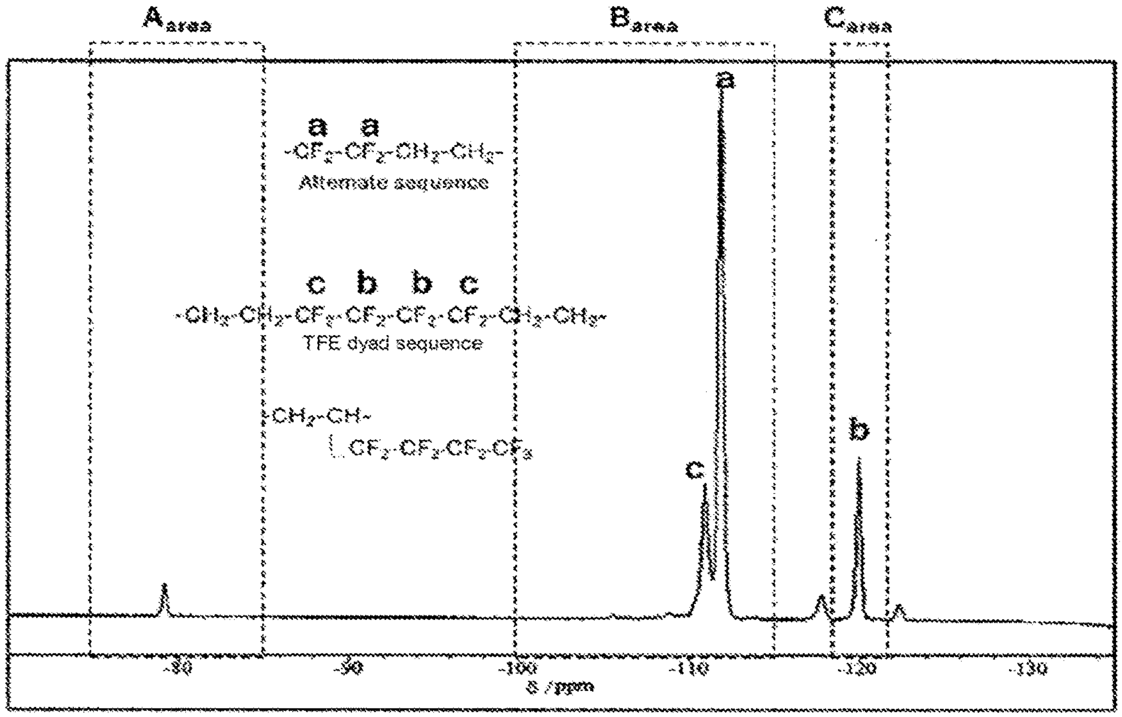
FIG. 1 is a chart obtained when $^{19}$F-NMR measurement was conducted by using the copolymer according to one embodiment of the present invention.

The meanings of the terms in the present invention are as follows.

A "unit" in a polymer means an atomic group formed directly by polymerization of a monomer, derived from one molecule of the above monomer, and also means an atomic group obtained by chemical conversion of a part of the above atomic group after polymerization. In the following, in some cases, a unit derived from an individual monomer will be referred to by the name having "unit" attached to the name of the monomer.

A "TEE unit" refers to a unit based on tetrafluoroethylene in the polymer, and an "E unit" refers to a unit based on ethylene in the polymer.

A "TFE dyad sequence" refers to a structure of a portion in the sequence of TFE units and E units in a copolymer where two TFE units are continuously arranged between E units, and refers to the underlined portion of the structure represented by "-E-TFE-TFE-E-". As represented by a chemical formula, it refers to the underlined portion of the structure represented by "—$CH_2$—$CH_2$—$CF_2$—$CF_2$—$CF_2$—$CF_2$—$CH_2$—$CH_2$—".

The "$CF_2$ side $CF_2$ in a TFE dyad sequence" means $CF_2$ having the following (b) attached, in the structure represented by "—$CH_2$—$CH_2$—$CF_2$—$CF_2$—$CF_2$—$CF_2$—$CH_2$—$CH_2$—".

"—$CH_2$—$CH_2$—$CF_2$-$CF_2^{(b)}$-$CF_2^{(b)}$—$CF_2$—$CH_2$—$CH_2$—"

The "$CH_2$ side $CF_2$ in a TFE dyad sequence" means $CF_2$ having the following (c) attached, in the structure represented by "—$CH_2$—$CH_2$—$CF_2$—$CF_2$—$CF_2$—$CF_2$—$CH_2$—$CH_2$—".

"—$CH_2$—$CH_2$-$CF_2^{(c)}$—$CF_2$—$CF_2$-$CF_2^{(c)}$—$CH_2$—$CF_{12}$—"

The "TFE-E alternate sequence" refers to a structure of a portion in the sequence of TFE units and E units in a copolymer where a TFE unit and an E unit are alternately and consecutively arranged, and refers to a structure represented by "-TFE-E-". As represented by a chemical structure, it refers to a structure represented by "—$CF_2$—$CF_2$—$CH_2$—$CH_2$—".

The "$CF_2$ in the TFE-E alternate sequence" means $CF_2$ having the following (a) attached in "—$CF_2$—$CF_2$—$CH_2$—$CH_2$—".

"-$CF_2^{(a)}$-$CF_2^{(a)}$—$CH_2$—$CH_2$—"

[Copolymer]

The copolymer of the present invention (hereinafter referred to also as "the present copolymer") comprises E units, TFE units and units based on the formula (A) or formula (B) as described below. The present copolymer has a crystal lamella thickness of at most 4.0 nm as determined by the small angle X-ray scattering method and a melting point of at least 245° C.

The present copolymer can form a coated electrical wire excellent in engine oil resistance. The details of the reason for this have not yet been clarified, but are assumed to be due to the following reason.

In the present invention, the engine oil resistance is evaluated by the presence or absence of cracks in the coating layer after the coated electrical wire having the coating layer obtained by using the copolymer is immersed in engine oil and then left for a long time under a high temperature.

One of the reasons why the present copolymer can form a coated electrical wire excellent in engine oil resistance is considered to be due to the use of a copolymer having a crystal lamella thickness of at most 4.0 nm and a melting point of at least 245° C.

That is, it is considered that if the crystal lamella thickness of the copolymer is small, the stiffness of the coating layer of the coated electrical wire formed by using the copolymer is lowered. It is assumed that it has thereby been possible to suppress the occurrence of cracks in the coating layer.

Further, the high melting point of the copolymer is considered to reduce a thermal damage to the coating layer in the evaluation of engine oil resistance conducted at a high temperature. It is assumed that it has thereby been possible to suppress the occurrence of cracks in the coating layer.

Thus, it is assumed that by specifying the crystal lamella thickness and the melting point of the copolymer, the effects of the respective physical properties have acted synergistically, whereby a coated electrical wire excellent in engine oil resistance has been obtained.

The present copolymer is a copolymer comprising E units, TFE units and units (hereinafter referred to also as "A units") based on a compound represented by the formula (A) (hereinafter referred to also as "compound A") or units (hereinafter referred to also as "B units") based on a compound represented by the formula (B) (hereinafter referred to also as "compound B").

$CH_2{=}CX(CF_2)_nY$ Formula (A)

$CF_2{=}CF{-}O{-}C_3F_7$ Formula (B)

In the formula (A), X and Y are each independently a hydrogen atom or a fluorine atom. X is preferably a hydrogen atom from the viewpoint of the polymerizability. Y is preferably a fluorine atom from the viewpoint of the heat resistance.

n is an integer of from 2 to 6.

As compound A, from the viewpoint of better engine oil resistance, $CH_2{=}CH(CF_2)_2F$, $CH_2{=}CH(CF_2)_4F$, $CH_2{=}CH(CF_2)_6F$, $CH_2{=}CF(CF_2)_4F$ and $CH_2{=}CF(CF_2)_3H$ are preferred, and $CH_2{=}CH(CF_2)_4F$ (hereinafter referred to also as "PFBE") is particularly preferred.

The present copolymer is preferably a copolymer having E units, TFE units and A units from the viewpoint of superior abrasion resistance and stress cracking resistance.

The content of E units is preferably from 35 to 60 mol %, more preferably from 40 to 55 mol %, further preferably from 44 to 52 mol %, particularly preferably from 45 to 50 mol %, to all units contained in the present copolymer. When it is at least 35 mol %, the mechanical properties and engine oil resistance will be better, and when it is at most 60 mol %, the heat resistance will be better.

The content of TFE units is preferably from 40 to 65 mol %, more preferably from 45 to 60 mol %, further preferably from 48 to 56 mol %, particularly preferably from 50 to 54 mol %, to all units contained in the present copolymer. When it is at least 40 mol %, the heat resistance will be better, and when it is at most 65 mol %, the mechanical properties and engine oil resistance will be better.

In a case where the present copolymer contains A units, the content of A units is preferably from 1 to 5 mol %, more preferably from 2 to 4 mol %, particularly preferably from 2.5 to 3.5 mol %, to all units contained in the present copolymer. When it is at least 1 mol %, the crystal lamella thickness of the present copolymer can be made small, and when it is at most 5 mol %, the melting point of the present copolymer can be made high.

In a case where the present copolymer contains B units, the content of B units is preferably from 1 to 5 mol %, more preferably from 2 to 4 mol %, particularly preferably from 2.5 to 3.5 mol %, to all units contained in the present copolymer. When it is at least 1 mol %, the crystal lamella thickness of the present copolymer can be made small, and when it is at most 5 mol %, the melting point of the present copolymer can be made high.

The present copolymer preferably comprises from 40 to 64 mol % of TFE units, from 35 to 59 mol % of E units and from 1 to 5 mol % of A units; more preferably comprises from 45 to 58 mol % of TFE units, from 40 to 53 mol % of E units and from 2 to 4 mol % of A units; further preferably comprises from 48 to 53.5 mol % of TFE units, from 44 to 49.5 mol % of E units and from 2.5 to 3.5 mol % of A units.

<Crystal Lamella Thickness>

The crystal lamella thickness of the present copolymer is at most 4.0 nm, and from the viewpoint of better engine oil resistance, preferably at most 3.95 nm, more preferably at most 3.9 nm, particularly preferably at most 3.85 nm.

Further, the crystal lamella thickness of the present copolymer is preferably at least 2.0 nm, more preferably at least 2.5 nm, particularly preferably at least 3.0 nm, from the viewpoint of maintaining the excellent mechanical strength and melting point of the present copolymer.

As a specific example of the method to bring the crystal lamella thickness of the present copolymer within the above range, a method of adjusting the contents of A units and B units in the present copolymer, may be mentioned.

The crystal lamella thickness of the present copolymer is measured by the small-angle X-ray scattering method (SAXS method), and specifically obtained by the measurement conditions as described in the section of Examples given later.

<Melting Point>

The melting point of the present copolymer is at least 245° C., and from the viewpoint of the better engine oil resistance, preferably at least 246° C., more preferably at least 248° C., particularly preferably at least 249° C.

Further, the melting point of the present copolymer is preferably at most 290° C., more preferably at most 280° C., particularly preferably at most 270° C., from the viewpoint of excellent moldability of the present copolymer.

As a specific example of the method to bring the melting point of the present copolymer within the above range, a method of lowering the polymerization temperature at the time of the production of the present copolymer, or a method of adjusting the contents of A units and B units in the present copolymer may be mentioned.

The melting point of the present copolymer is the temperature corresponding to the endothermic peak at the time when the present copolymer is heated by raising the temperature at 10° C./min under an air atmosphere by using a scanning differential thermal analyzer.

<Melt Flow Rate>

The melt flow rate (hereinafter referred to also as "MFR") of the present copolymer is preferably from 15 to 60 g/10 min, more preferably from 25 to 55 g/10 min, particularly preferably from 30 to 50 g/10 min. When MFR of the present copolymer is at least 15 g/10 min, the melt formability of the present copolymer will be excellent. When MFR of the present copolymer is at most 60 g/10 min, a molded product obtained by using the present copolymer will have excellent mechanical strength at a high temperature.

On the other hand, from such a viewpoint that the molded product obtained by using the present copolymer will be excellent in the abrasion resistance, MFR of the present copolymer is preferably at most 25 g/10 min, more preferably at most 20 g/10 min. Therefore, from the viewpoint of satisfying both the melt formability of the present copolymer and the abrasion resistance of the molded body obtained by using the present copolymer, MFR of the present copolymer is preferably from 15 to 25 g/m in, more preferably from 15 to 20 g/m in.

As a specific example of the method to bring MFR of the present copolymer within the above range, a method of adjusting the molecular weight of the present copolymer may be mentioned. The higher the molecular weight of the present copolymer, the smaller the MFR.

MFR of the present copolymer means the mass of the present copolymer flowing out of an orifice of 2 mm in diameter and 8 mm in length in 10 minutes, as measured under conditions of a temperature of 297° C. and a load of 49 N in accordance with ASTM D3159.

<M Value>

The M value of the present copolymer is preferably at most 0.20, more preferably at most 0.19, particularly preferably at most 0.18, from such a viewpoint that the melting point of the present copolymer will be higher and the engine oil resistance will be better.

Further, the M value of the present copolymer is preferably at least 0.10, more preferably at least 0.11, particularly preferably at least 0.12, from the viewpoint of better stress cracking resistance and heat resistance.

Here, the M value of the present copolymer is a value indicating the degree to which a TFE unit and an E unit are alternately arranged in the present copolymer, and is determined by the following calculation method. The smaller the M value, the higher the ratio of alternately bonded TFE unit and E unit in the present copolymer.

As a specific example of the method to bring the M value of the present copolymer within the above range, a method of lowering the polymerization temperature at the time of the production of the present copolymer, may be mentioned.

The M value is calculated by the following formula (1) based on a chart obtained by 400 MHz $^{19}$F-NMR measurement by using a melt of the present copolymer.

M value=C1/B1 Formula (1)

B1: Sum of integrated values of peaks observed in the range of chemical shift of from −100 to −115 ppm C1: Sum of integrated values of peaks observed in the range of chemical shift of from −118.5 to −122 ppm The chemical shifts in B1 and C1 are chemical shifts observed when the chemical shift of the peak of $CF_2$ (i.e. $CF_2$ side $CF_2$ in the TFE dyad sequence) at the position where, at a portion where two consecutive TFE units of the present copolymer are continuous, one TFE unit and the other TFE unit are directly bonded, is set to be −120 ppm.

B1 means the sum, of the integral value of peaks of $CF_2$ in the TFE-E alternate sequence and the integral value of peaks of $CH_2$ side $CF_2$ in the TFE dyad sequence. That is, B1 is a numerical value that mainly expresses that a TFE unit and an E unit are alternately bonded, and when B1 is large, it means that the ratio of the portion in which a TFE unit and an E unit are alternately bonded in the present copolymer is high.

Here, B1 does not include the integral value of peaks observed in the chemical shift range of from −100 to −115 ppm derived from compound A and compound B. The reason for this is as follows.

That is, there are cases where peaks derived from compound A and compound B are observed in the range of chemical shift of from −100 to −115 ppm. The unit based on compound A (i.e. A unit) and the unit based on compound B (i.e. B unit) are units that do not constitute the alternately bonded portion of TFE unit and E unit. Therefore, it is necessary to exclude the integral value of peaks observed in the range of chemical shift of from −100 to −115 ppm derived from compound A and compound B from the sum (hereinafter also referred to as "B") of integral values of the respective peaks observed in the range of chemical shift of from −100 to −115 ppm. That is, B1 is the value obtained by subtracting from B the integral value of the peaks observed in the range of chemical shift of from −100 to −115 ppm derived from compound A and compound B.

C1 means the integral value of peaks of $CF_2$ side $CF_2$ in the TFE dyad sequence. That is, C1 is a numerical value that mainly expresses the continuous bonding of a TFE unit and a TFE unit, and when C1 is large, it means that the ratio of the portion in which a TFE unit and a TFE unit are continuously bonded in the present copolymer is high.

Here, C1 does not include the integral value of peaks observed in the range of chemical shift of from −118.5 to −122 ppm, which are derived from compound A and compound B. The reason for this is as follows.

That is, there are cases where peaks derived from compound A and compound B are observed in the range of chemical shift of from −118.5 to −122 ppm. The unit based on compound A (i.e. A unit) and the unit based on compound B (i.e. B unit) are units that do not constitute a portion where a TFE unit and a TFE unit are continuously bonded. Therefore, it is necessary to exclude the integral value of peaks observed in the range of chemical shift of from −118.5 to −122 ppm, which are derived from compound A and compound B from the sum (hereinafter also referred to as "C") of integral values of the respective peaks observed in the range of chemical shift of from −118.5 to −122 ppm. That is, C1 is the value obtained by subtracting from C the integral value of peaks observed in the range of chemical shift of from −118.5 to −122 ppm derived from compound A and compound B.

The integral value of the respective peaks is obtained by taking integral at a portion which becomes a valley in its range. More specifically, it is obtained by taking the chemical shift of from −100 to −130 ppm as the baseline and dividing it vertically by the chemical shift within predetermined ranges. Specifically, B1 is obtained by vertically dividing the range of chemical shift of from −100 ppm to −115 ppm toward the baseline. Further, C1 is obtained by vertically dividing the range of chemical shift of from −118.5 ppm to −122 ppm toward the baseline.

In the following, the calculation method for the M value will be explained for each representative specific example of compound A and compound B.

(Calculation Method for M Value: In a Case where Compound A is $CH_2{=}CH(CF_2)_4F$)

In a case where the present copolymer contains units based on $CH_2{=}CH(CF_2)_4F$, which is one embodiment of compound A, the M value of the present copolymer is calculated by the following formula (2-1) based on a chart obtained by 400 MHz $^{19}$F-NMR measurement by using a melt of the present copolymer.

M value={C−(A/3)×2}/{B−(A/3)×2} Formula (2-1)

A: Sum of integrated values of peaks observed in the range of chemical shift of from −75 to −85 ppm B: Sum of integrated values of peaks observed in the range of chemical shift of from −100 to −115 ppm C: Sum of integrated values of peaks observed in the range of chemical shift of from −118.5 to −122 ppm The chemical shifts in A, B, and C are chemical shifts observed when the chemical shift of the peak of $CF_2$ (i.e. $CF_2$ side $CF_2$ in the TFE dyad sequence) at the position where, at the portion where two consecutive TFE units of the present copolymer are continuous, one TFE unit and the other TFE unit are directly bonded, is set to be −120 ppm.

The formula (2-1) will be explained in detail with reference to FIG. 1. FIG. 1 is a chart obtained by 400 MHz $^{19}$F-NMR measurement by using a melt of a copolymer containing E units, TFE units and units based on $CH_2{=}CH(CF_2)_4F$.

$A_{area}$, $B_{area}$ and $C_{area}$ in FIG. 1 are, respectively, regions shown for ease of understanding of the positions of peaks observed in the range of chemical shift of from −75 to −85 ppm, the positions of peaks observed in the range of chemical shift of from −100 to −115 ppm, and the positions of peaks observed in the range of chemical shift of from −118.5 to −122 ppm.

In $A_{area}$ in FIG. 1, a peak corresponding to $CF_3$ in the unit represented by $—CH_2—CH(CF_2—CF_2—CF_2—CF_3)—$ is observed. Therefore, A in the formula (2-1) means the integral value of the peak corresponding to $CF_3$.

In $B_{area}$ in FIG. 1, a peak a corresponding to $CF_2$ in the TFE-E alternate sequence and a peak c corresponding to $CH_2$ side $CF_2$ in the TFE dyad sequence are observed.

Further, in $B_{area}$, a peak corresponding to one $CF_2$ in the unit based on $CH_2{=}CH(CF_2)_4F$, that is, the unit represented by $—CH_2—CH(CF_2—CF_2—CF_2—CF_3)—$, is detected. Therefore, B in the formula (2-1) means the sum of integrated values of these peaks.

Here, the unit represented by $—CH_2—CH(CF_2—CF_2—CF_2—CF_3)—$ is a unit that does not constitute a portion in which a TFE unit and an E unit are alternately bonded. Therefore, it is necessary to exclude the integral value of the peak corresponding to one $CF_2$ of the unit represented by $—CH_2—CH(CF_2—CF_2—CF_2—CF_3)—$ detected in $B_{area}$, from B in the formula (2-1), but the integral value of the peak cannot be directly calculated. Therefore, it is calculated by multiplying ⅔ to the integral value of the peak corresponding to $CF_3$ of the unit represented by $—CH_2—CH(CF_2—CF_2—CF_2—CF_3)—$ observed in $A_{area}$. The reason for multiplying ⅔ here is that the number of fluorine atoms in $CF_3$ is 3, while the number of fluorine atoms in $CF_2$ is 2, so the integral value of the peak corresponding to $CF_3$ multiplied by ⅔ corresponds to the integral value of the peak corresponding to $CF_2$. Since the integral value of the peak corresponding to $CF_3$ is A, in the formula (2-1), (A/3)×2 is subtracted from B.

In $C_{area}$ in FIG. 1, a peak b corresponding to the $CF_2$ side $CF_2$ in the TFE dyad sequence is observed. Further, in $C_{area}$, a peak of one $CF_2$ in the unit based on $CH_2{=}CH(CF_2)_4F$, that is, the unit represented by $—CH_2—CH(CF_2—CF_2—CF_2—CF_3)—$ is detected. Therefore, C in the formula (2-1) means the sum of integrated values of these peaks.

Here, the unit represented by $—CH_2—CH(CF_2—CF_2—CF_2—CF_3)—$ is a unit that does not constitute a portion in which a TFE unit and a TFE unit are continuously bonded. Therefore, it is necessary to exclude the integral value of the peak corresponding to one $CF_2$ of the unit represented by $—CH_2—CH(CF_2—CF_2—CF_2—CF_3)—$ detected in $C_{area}$ from C in the formula (2-1), but the integral value of the said peak cannot be directly calculated. Therefore, it is calculated by multiplying ⅔ to the integral value of the peak corresponding to $CF_3$ of the unit represented by $—CH_2—CH(CF_2—CF_2—CF_2—CF_3)—$ observed in $A_{area}$. The reason for multiplying ⅔ here is that the number of fluorine atoms in $CF_3$ is 3, while the number of fluorine atoms in $CF_2$ is 2, so the value obtained by multiplying ⅔ to the integral value of the peak corresponding to $CF_3$ corresponds to the integral value of the peak corresponding to $CF_2$. Since the integral value of the peak corresponding to $CF_3$ is A, in the formula (2-1), (A/3)×2 is subtracted from C.

(Calculation Method for M Value: In a Case where Compound a is $CH_2{=}CH(CF_2)_6F$)

In a case where the present copolymer contains a unit based on $CH_2{=}CH(CF_2)_6F$, which is one embodiment of compound A, the M value of the present copolymer is calculated by the following formula (2-2) based on a chart obtained by 400 MHz $^{19}$F-NMR measurement by using a melt of the present copolymer.

$$\text{M value}=\{C-(A/3)\times 4\}/\{B-(A/3)\times 2\} \quad \text{Formula (2-2)}$$

- A: Sum of integrated values of peaks observed in the range of chemical shift of from −75 to −85 ppm
- B: Sum of integrated values of peaks observed in the range of chemical shift of from −100 to −115 ppm
- C: Sum of integrated values of peaks observed in the range of chemical shift of from −118.5 to −122 ppm The chemical shifts in A, B and C are chemical shifts observed when the chemical shift of the peak of $CF_2$ (i.e. $CF_2$ side $CF_2$ in the TFE dyad sequence) at the position where, at the portion where two consecutive TFE units of the present copolymer are continuous, one TFE unit and the other TFE unit are directly bonded, is set to be −120 ppm.

Figure 2:
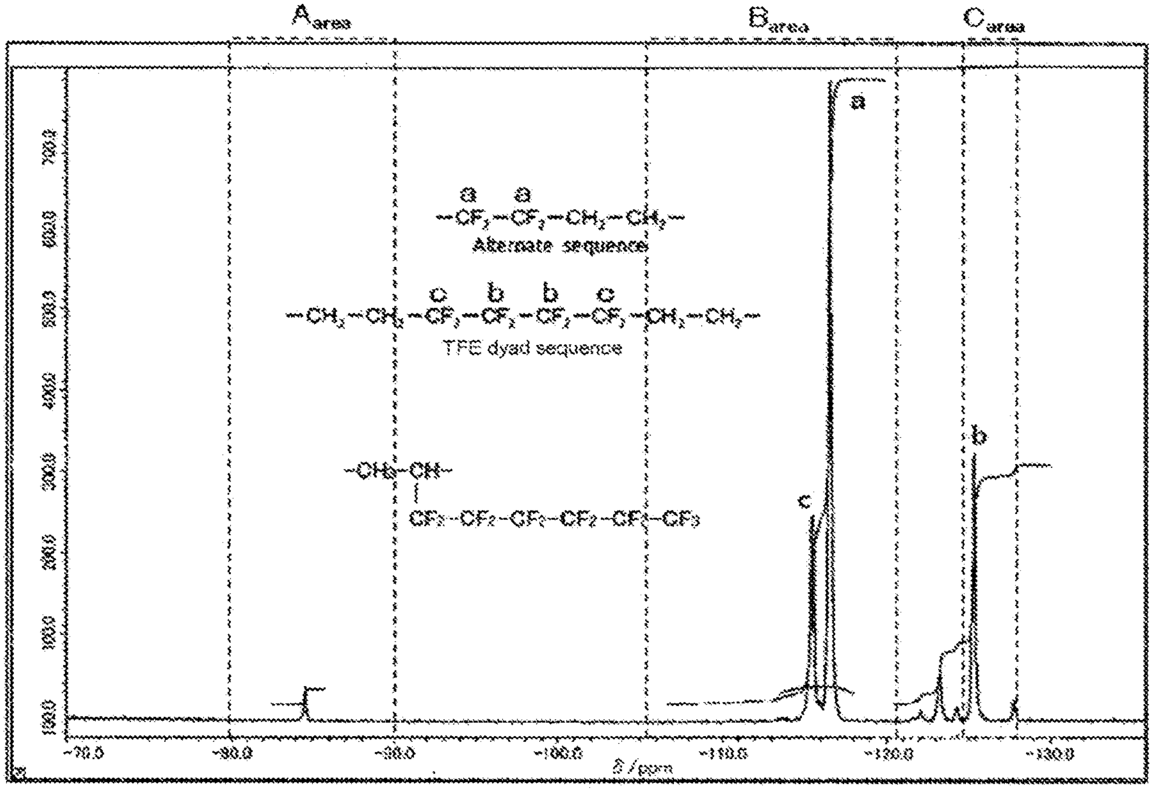
FIG. 2 is a chart obtained when $^{19}$F-NMR measurement was conducted by using the copolymer according to one embodiment of the present invention.

The formula (2-2) will be explained in detail with reference to FIG. 2. FIG. 2 is a chart obtained by 400 MHz $^{19}$F-NMR measurement by using a melt of a copolymer comprising E units, TFE units and units based on $CH_2{=}CH(CF_2)_6F$ (i.e. units represented by $—CH_2—CH(CF_2—CF_2—CF_2—CF_2—CF_2—CF_3)$).

The meanings of $A_{area}$, $B_{area}$ and $C_{area}$ in FIG. 2 are, respectively, the same as the meanings of $A_{area}$, $B_{area}$ and $C_{area}$ in FIG. 1.

Further, also the meanings of the alphabets attached to the peaks in the respective regions in FIG. 2 are the same as the meanings of the alphabets attached to the peaks in the respective regions in FIG. 1.

In $A_{area}$ in FIG. 2, a peak corresponding to $CF_3$ in the unit represented by $—CH_2—CH(CF_2—CF_2—CF_2—CF_2—CF_2—CF_3)—$ is observed. Therefore, A in the formula (2-2) means the integral value of the peak corresponding to $CF_3$.

In $B_{area}$ in FIG. 2, a peak a corresponding to $CF_2$ in the TFE-E alternate sequence and a peak c corresponding to $CH_2$ side $CF_2$ in the TFE dyad sequence are observed. Further, in $B_{area}$, a peak corresponding to one $CF_2$ in the unit based on $CH_2{=}CH(CF_2)_6F$, that is, the unit represented by $—CH_2—CH(CF_2—CF_2—CF_2—CF_2—CF_2—CF_3)—$, is detected. Therefore, B in the formula (2-2) means the sum of integrated values of these peaks.

Here, the unit represented by $—CH_2—CH(CF_2—CF_2—CF_2—CF_2—CF_2—CF_3)—$ is a unit that does not constitute the portion where a TFE unit and a E unit are alternately bonded. Therefore, it is necessary to exclude the integral value of the peak corresponding to one $CF_2$ in the unit represented by $—CH_2—CH(CF_2—CF_2—CF_2—CF_2—CF_2—CF_3)—$ detected in $B_{area}$ from B in the formula (2-2), but the integral value of said peak cannot be directly calculated. Therefore, it is calculated by multiplying ⅔ to the integral value of the peak corresponding to $CF_3$ of the unit represented by $—CH_2—CH(CF_2—CF_2—CF_2—CF_2—CF_2—CF_3)—$ observed in $A_{area}$. The reason for multiplying ⅔ here is that the number of fluorine atoms in $CF_3$ is 3, while the number of fluorine atoms in $CF_2$ is 2, so the value obtained by multiplying ⅔ to the integral value of the peak corresponding to $CF_3$ corresponds to the integral value of $CF_2$. Since the integral value of the peak corresponding to $CF_3$ is A, in the formula (2-2), (A/3)×2 is subtracted from C.

In $C_{area}$ in FIG. 2, a peak b corresponding to $CF_2$ side $CF_2$ in the TFE dyad sequence is observed. Further, in $C_{area}$, a peak corresponding to two $CF_2$ in the unit based on $CH_2{=}CH(CF_2)_6F$, that is, the unit represented by $—CH_2—CH(CF_2—CF_2—CF_2—CF_2—CF_2—CF_3)—$ is detected. Therefore, C in formula (2-2) means the sum of integrated values of these peaks.

Here, the unit represented by $—CH_2—CH(CF_2—CF_2—CF_2—CF_2—CF_2—CF_3)—$ is a unit that does not constitute a portion in which a TFE unit and a TFE unit are continuously bonded. Therefore, it is necessary to exclude the integral value corresponding to the two $CF_2$ peaks of the unit represented by $—CH_2—CH(CF_2—CF_2—CF_2—CF_2—CF_2—CF_3)—$ detected in $C_{area}$ from C in the formula (2-2), but the integral value of said peaks cannot be directly calculated. Therefore, it is calculated by multiplying 4/3 to the integral value of the peak corresponding to $CF_3$ of the unit represented by $—CH_2—CH(CF_2—CF_2—CF_2—CF_2—CF_2—CF_3)—$ observed in $A_{area}$. The reason for multiplying 4/3 here is that the number of fluorine atoms in $CF_3$ is 3, while the number of fluorine atoms in $CF_2$ is 2, and there are two such peaks, so the value obtained by multiplying 4/3 to the integral value of the peak corresponding to $CF_3$ corresponds to the integral value of the peak corresponding to the two $CF_2$. The integral value of the peak corresponding to $CF_3$ is A, and therefore, in the formula (2-2), (A/3)×4 is subtracted from C.

(Calculation Method for M Value: In a Case where Compound a is $CH_2$═$CH(CF_2)_2F$)

In a case where the present copolymer contains units based on $CH_2$═$CH(CF_2)_2F$, which is an embodiment of compound A, the M value of the present copolymer is calculated by the following formula (2-3) based on a chart obtained by 400 MHz $^{19}$F-NMR measurement by using a melt of the present copolymer.

$$M\ value = C/\{B-(A/3)\times 2\} \quad \text{Formula (2-3)}$$

A: Sum of integrated values of peaks observed in the range of chemical shift of from −75 to −85 ppm B: Sum of integrated values of peaks observed in the range of chemical shift of from −100 to −115 ppm C: Sum of integrated values of peaks observed in the range of chemical shift of from −118.5 to −122 ppm The chemical shifts in A, B and C are chemical shifts observed when the chemical shift of a peak of $CF_2$ (i.e. $CF_2$ side $CF_2$ in the TFE dyad sequence) at a position where, at a portion where two consecutive TFE units in the present copolymer are continuous, one TFE unit and the other TFE unit are directly bonded, is set to be −120 ppm.

Figure 3:
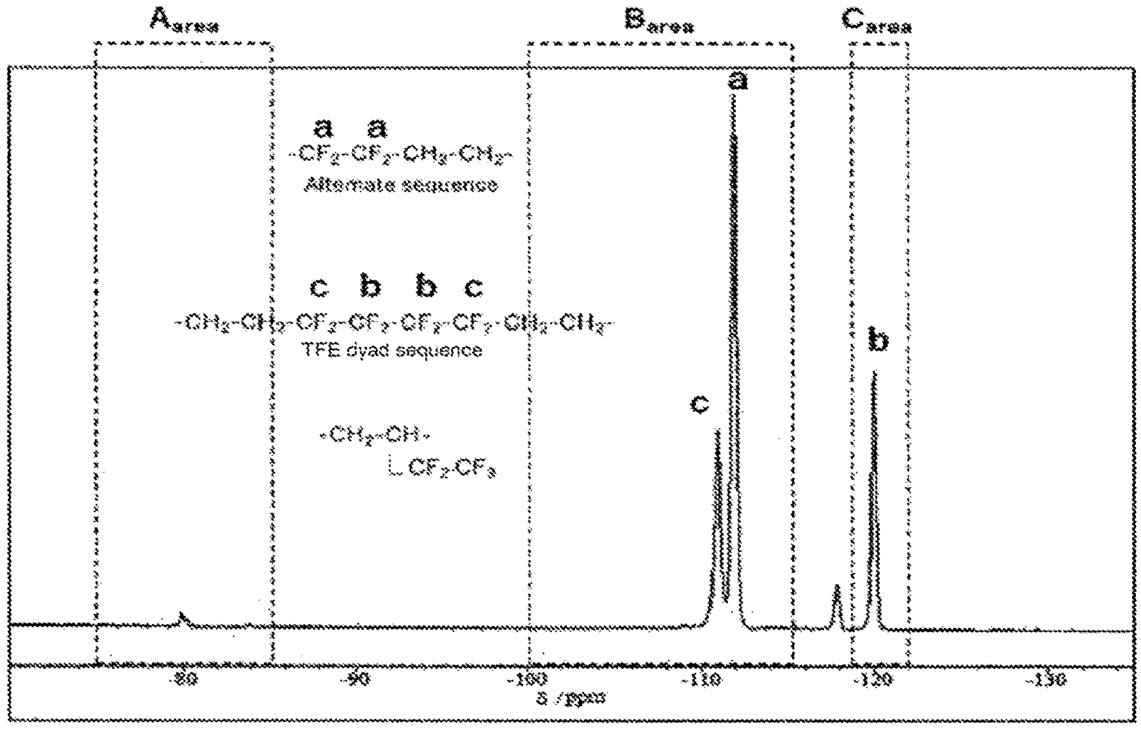
FIG. 3 is a chart obtained when $^{19}$F-NMR measurement was conducted by using the copolymer according to one embodiment of the present invention.

The formula (2-3) will be explained in detail with reference to FIG. 3. FIG. 3 is a chart obtained by 400 MHz $^{19}$F-NMR measurement by using a melt of a copolymer comprising E units, TFE units and units based on $CH_2$═$CH(CF_2)_2F$ (i.e. units represented by —$CH_2$—$CH(CF_2$—$CF_3)$—).

The meanings of $A_{area}$, $B_{area}$ and $C_{area}$ in FIG. 3 are, respectively, the same as the meanings of $A_{area}$, $B_{area}$ and $C_{area}$ in FIG. 1.

Further, also the meanings of the alphabets attached to the peaks in the respective regions in FIG. 3 are the same as the meanings of the alphabets attached to the peaks in the respective regions in FIG. 1.

In $A_{area}$ in FIG. 3, a peak corresponding to $CF_3$ in the unit represented by —$CH_2$—$CH(CF_2$—$CF_3)$— is observed. Therefore, A in the formula (2-3) means the integral value of the peak corresponding to $CF_3$.

In $B_{area}$ in FIG. 3, a peak a corresponding to $CF_2$ in the TFE-E alternate sequence and a peak c corresponding to $CH_2$ side $CF_2$ in the TFE dyad sequence are observed. Further, in $B_{area}$, a peak corresponding to one $CF_2$ in the unit based on $CH_2$═$CH(CF_2)_2F$, that is, the unit represented by —$CH_2$—$CH(CF_2$—$CF_3)$—, is detected. Therefore, B in the formula (2-3) means the sum of integrated values of these peaks.

Here, the unit represented by —$CH_2$—$CH(CF_2$—$CF_3)$— is a unit that does not constitute the portion where a TFE unit and an E unit are alternately bonded. Therefore, it is necessary to exclude the integral value of the peak corresponding to one $CF_2$ in the unit represented by —$CH_2$—$CH(CF_2$—$CF_3)$— detected in $B_{area}$, from B in the formula (2-3). However, the integral value of the peak cannot be directly calculated. Therefore, it is calculated by multiplying ⅔ to the integral value of the peak corresponding to $CF_3$ of the unit represented by —$CH_2$—$CH(CF_2$—$CF_3)$— observed in $A_{area}$. The reason for multiplying ⅔ here is that the number of fluorine atoms in $CF_3$ is 3 while the number of fluorine atoms in $CF_2$ is 2, so the value obtained by multiplying ⅔ to the integral value of $CF_3$ corresponds to the integral value of the peak corresponding to $CF_2$. Since the integral value of the peak corresponding to $CF_3$ is A, in the formula (2-3), (A/3)×2 is subtracted from B.

In $C_{area}$ in FIG. 3, a peak b corresponding to $CF_2$ side $CF_2$ in the TFE dyad sequence is observed. Therefore, C in the formula (2-3) means the integral value of peak b.

(Calculation Method for M Value: In a Case where Compound a is $CH_2$═$CF(CF_2)_3H$)

In a case where the present copolymer contains units based on $CH_2$═$CF(CF_2)_3H$, which is one embodiment of compound A, the M value of the present copolymer is calculated by the following formula (3-1) based on a chart obtained by 400 MHz $^{19}$F-NMR measurement by using a melt of this copolymer.

$$M\ value = C/B \quad \text{Formula (3-1)}$$

B: Sum of integrated values of peaks observed in the range of chemical shift of from −100 to −115 ppm C: Sum of integrated values of peaks observed in the range of chemical shift of from −118.5 to −122 ppm The chemical shifts in B and C are chemical shifts observed when the chemical shift of the peak of $CF_2$ (i.e. $CF_2$ side $CF_2$ in the TFE dyad sequence) at the position where, at a portion where two consecutive TFE units in the present copolymer are continuous, one TFE unit and the other TFE unit are directly bonded, is set to be −120 ppm.

Figure 4:
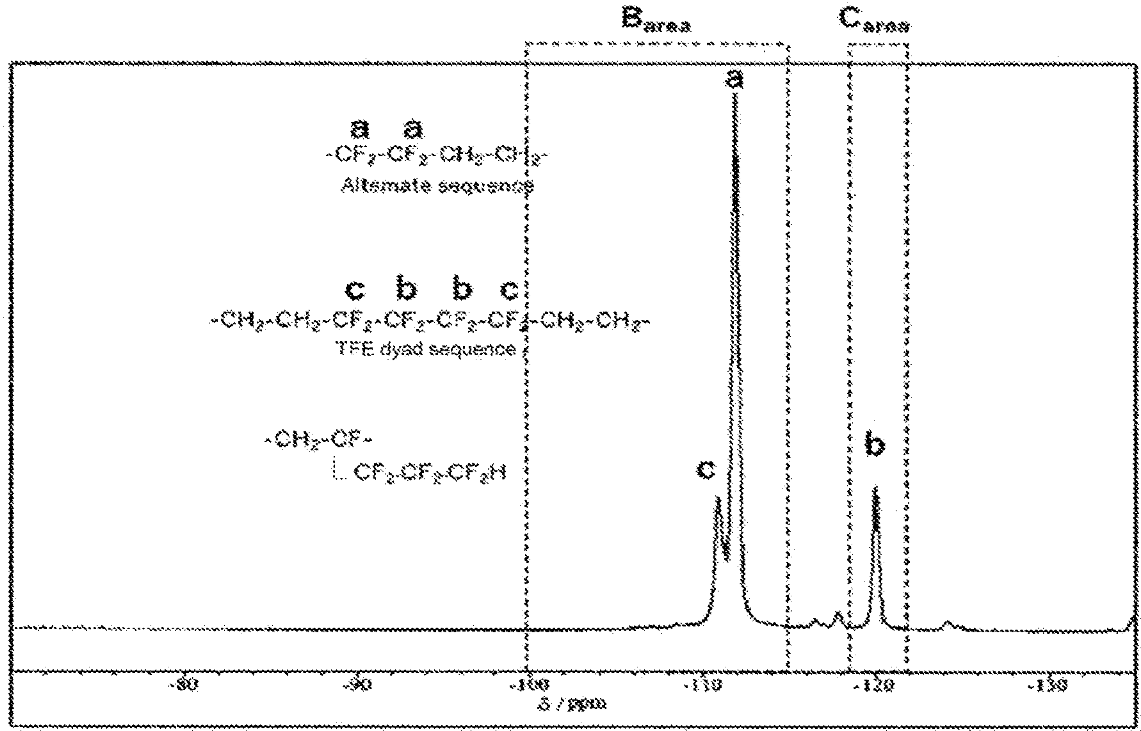
FIG. 4 is a chart obtained when $^{19}$F-NMR measurement was conducted by using the copolymer according to one embodiment of the present invention.

The formula (3-1) will be explained in detail with reference to FIG. 4. FIG. 4 is a chart obtained by 400 MHz $^{19}$F-NMR measurement by using a melt of a polymer comprising E units, TFE units and units based on $CH_2$═$CF(CF_2)_3H$ (i.e. units represented by —$CH_2$—$CF(CF_2$—$CF_2$—$CF_2H)$—).

The meanings of $B_{area}$ and $C_{area}$ in FIG. 4 are, respectively, the same as the meanings of $B_{area}$ and $C_{area}$ in FIG. 1.

Further, also the meanings of the alphabets attached to the peaks in the respective regions in FIG. 4 are the same as the meanings of the alphabets attached to the peaks in the respective regions in FIG. 1.

In $B_{area}$ in FIG. 4, a peak a corresponding to $CF_2$ in the TFE-E alternate sequence and a peak c corresponding to $CH_2$ side $CF_2$ in the TFE dyad sequence, are observed. Therefore, B in the formula (3-1) means the sum of the respective integrated values of the peak a and the peak c.

In $C_{area}$ in FIG. 4, a peak b corresponding to $CF_2$ side $CF_2$ in the TFE dyad sequence, is observed. Therefore, C in the formula (3-1) means the integral value of the peak b.

(Calculation Method for M Value: In a Case of Compound B)

In a case where the present copolymer contains units based on compound B (i.e. $CF_2$═$CF$—$O$—$C_3F_7$), the M value of the present copolymer can be calculated by the following formula (4-1) based on a chart obtained by 400 MHz $^{19}$F-NMR measurement by using a melt of the present copolymer.

$$M\ value = C/\{B-(A/5)\times 2\} \quad \text{Formula (4-1)}$$

A: Sum of integrated values of peaks observed in the range of chemical shift of from −75 to −85 ppm B: Sum of integrated values of peaks observed in the range of chemical shift of from −100 to −115 ppm C: Sum of integrated values of peaks observed in the range of chemical shift of from −118.5 to −122 ppm The chemical shifts in A, B and C are chemical shifts observed when the chemical shift of the peak of $CF_2$ (i.e. $CF_2$ side $CF_2$ in the TFE dyad sequence) at the position where, at a portion where two consecutive TFE units in the present copolymer are continuous, one TFE unit and the other TFE unit are directly bonded, is set to be −120 ppm.

Figure 5:
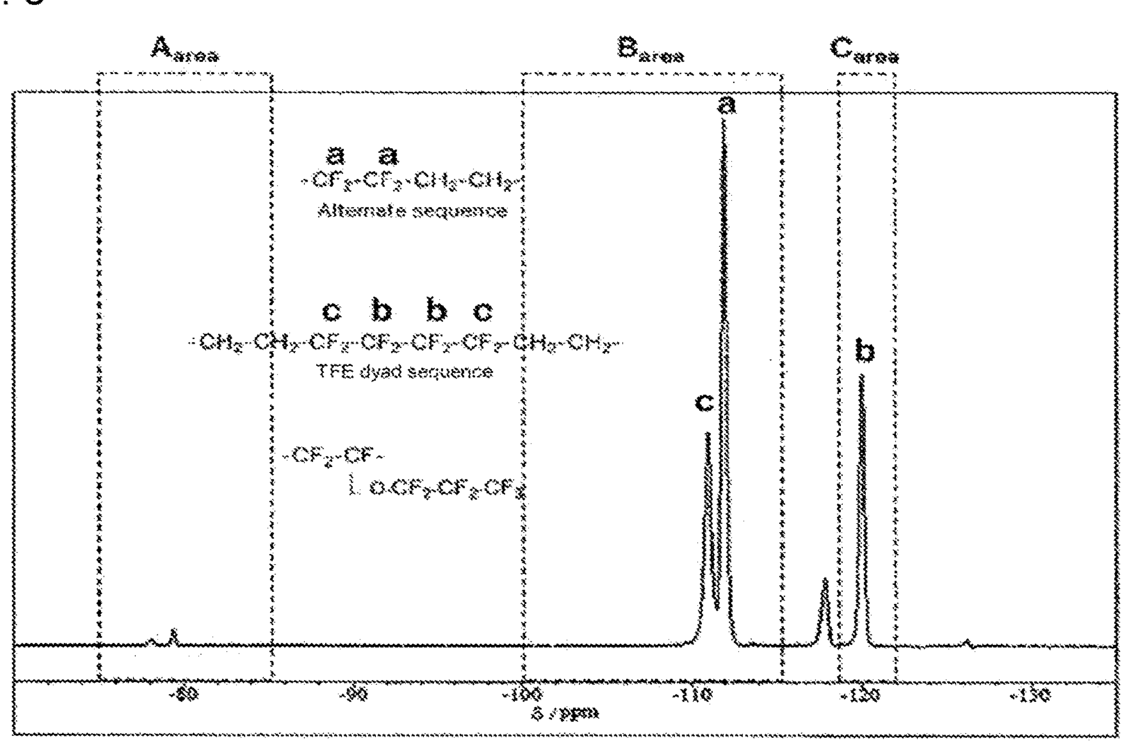
FIG. 5 is a chart obtained when $^{19}$F-NMR measurement was conducted by using the copolymer according to one embodiment of the present invention.

The formula (4-1) will be explained in detail with reference to FIG. 5. FIG. 5 is a chart obtained by 400 MHz $^{19}$F-NMR measurement by using a melt of a copolymer comprising E units, TFE units and units based on $CF_2$═CF—O—$C_3F_7$.

The meanings of $A_{area}$, $B_{area}$ and $C_{area}$ in FIG. 5 are, respectively, the same as the meanings of $A_{area}$, $B_{area}$ and $C_{area}$ in FIG. 1.

Further, also the meanings of the alphabets attached to the peaks in the respective regions in FIG. 5 are the same as the meanings of the alphabets attached to the peaks in the respective regions in FIG. 1.

In $A_{area}$ in FIG. 5, a peak corresponding to $CF_3$ in the unit represented by —$CF_2$—CF($OCF_2CF_2CF_3$)— and a peak e corresponding to one $CF_2$ in the unit represented by —$CF_2$—CF($OCF_2CF_2CF_3$)—, are observed. Therefore, A in the formula (4-1) means the sum of integrated values of these peaks.

In $B_{area}$ in FIG. 5, a peak a corresponding to $CF_2$ in the TFE-E alternate sequence and a peak c corresponding to $CH_2$ side $CF_2$ in the TFE dyad sequence, are observed. Further, in $B_{area}$, a peak corresponding to one $CF_2$ in the unit based on $CF_2$═CF($OCF_2$)$_3$F, that is, the unit represented by —$CF_2$—CF($OCF_2CF_2CF_3$)—, is detected. Therefore, B in the formula (4-1) means the sum of integrated values of these peaks.

Here, the unit represented by —$CF_2$—CF($OCF_2CF_2CF_3$)— is a unit that does not constitute the portion where a TFE unit and an E unit are alternately bonded. Therefore, it is necessary to exclude from B in the formula (4-1) the integral value of the peak corresponding to one $CF_2$ of the unit represented by —$CF_2$—CF($OCF_2CF_2CF_3$)— detected in $B_{area}$, but the integral value of the peak cannot be directly calculated. Therefore, it is calculated by multiplying ⅖ to the sum of the integral value of the peak corresponding to $CF_3$ and the integral value of the peak corresponding to one $CF_2$ in the unit represented by —$CF_2$—CF($OCF_2CF_2CF_3$)— observed in $A_{area}$. The reason for multiplying ⅖ here is that the number of fluorine atoms in $CF_3$ is 3 and the number of fluorine atoms in one $CF_2$ is 2, whereby the total is 5, while the number of fluorine atoms in $CF_2$ is 2, so the value obtained by multiplying ⅖ to the sum of the integral value of the peak corresponding to $CF_3$ and the integral value of the peak corresponding to one $CF_2$, corresponds to the integral value of $CF_2$. Since the $CF_3$ integral value is A, in the formula (4-1), $(A/5)\times 2$ is subtracted from B.

In $C_{area}$ in FIG. 5, a peak b corresponding to $CF_2$ side $CF_2$ in the TFE dyad sequence is observed. Therefore, C in the formula (4-1) means the integral value of the peak b.

<Production Method>

The present copolymer can be produced by a known method such as bulk polymerization, solution polymerization, suspension polymerization or emulsion polymerization, using the above-described monomers (ethylene, tetrafluoroethylene, and compound A or compound B), and it is particularly preferably produced by solution polymerization among them.

In the production of the present copolymer, in addition to the above-described monomers, a polymerization initiator, a polymerization medium, a chain transfer agent, etc. can be used.

As the polymerization initiator, a radical polymerization initiator, of which the temperature for a half-life of 10 hours is from 0 to 100° C., is preferred, and a radical polymerization initiator, of which said temperature is from 20 to 90° C. is particularly preferred. As specific examples of the polymerization initiator, various polymerization initiators exemplified in WO2013/015202 may be mentioned.

As the polymerization initiator, one type may be used alone, or two or more types may be used in combination.

The amount of the polymerization initiator to be used is preferably from 0.01 to 0.9 part by mass, particularly preferably from 0.05 to 0.5 part by mass, to 100 parts by mass of the amount of the monomers used.

As the polymerization medium, a perfluorocarbon, a hydrofluorocarbon, a hydrofluoroether, etc. may be used. As specific examples of the polymerization medium, polymerization media exemplified in WO2013/015202 may be mentioned.

As the polymerization medium, two or more types may be used in combination.

The amount of the polymerization medium to be used is preferably at least 5 times, more preferably at least 7 times, by mass ratio to the amount of monomers. Further, it is preferably at most 20 times, more preferably at most 17 times.

As the chain transfer agent, from the viewpoint of having a large chain transfer constant and requiring a small amount to be added, an alcohol such as methanol, ethanol, 2,2,2-trifluoroethanol, 2,2,3,3-tetrafluoropropanol, 1,1,1,3,3,3-hexafluoroisopropanol or 2,2,3,3,3-pentafluoropropanol, a hydrocarbon such as n-pentane, n-hexane or cyclohexane, a hydrofluorocarbon such as $CF_2H_2$, a ketone such as acetone, a mercaptan such as methyl mercaptan, an ester such as methyl acetate or ethyl acetate, or an ether such as diethyl ether or methyl ethyl ether, is preferred.

Among them, from the viewpoint of the higher chain transfer constant and higher stability of the end group of the present copolymer, an alcohol, a hydrocarbon and a hydrofluorocarbon are preferred; an alcohol and a hydrocarbon are more preferred; and an alcohol is particularly preferred. Among alcohols, methanol and ethanol are particularly preferred. Among them, methanol is particularly preferred from the viewpoint of its reactivity and availability. As the chain transfer agent, two or more types may be used in combination.

The amount of the chain transfer agent to be used is preferably at least 0.001 time, more preferably at least 0.005 time, by mass ratio, to the amount of monomers to be used. Further, it is preferably at most 5 times, more preferably at most 4 times.

The polymerization temperature is preferably from 15 to 60° C., more preferably from 20 to 58° C., particularly preferably from 25 to 55° C. When the polymerization temperature is at least 25° C., the polymerizability will be excellent. When the polymerization temperature is at most 60° C., the melting point of the copolymer can be improved, and the copolymer, of which the M value is within the above-mentioned range, can be easily obtained.

The polymerization pressure is preferably from 0.5 to 3.0 MPa, particularly preferably from 0.9 to 2.5 MPa.

The polymerization time is preferably from 1 to 12 hours.

[Composition]

The composition of the present invention (hereinafter referred to also as "the present composition") comprises the above-mentioned copolymer and an additive. Since the present composition contains the present copolymer, a molded product excellent in engine oil resistance can be obtained by using the present composition. Further, since the melting point of the present copolymer is high, a molded product excellent in heat resistance can be obtained by using the present composition.

As the additive, a heat stabilizer and an antioxidant are preferred. Further, the present composition may contain two or more types of additive.

The content of the present copolymer is preferably at least 50 mass % and less than 100 mass %, more preferably at least 70 mass % and less than 100 mass %, particularly preferably at least 90 mass % and less than 100 mass %, to the entire mass of the present composition.

<Heat Stabilizer>

It is preferred that the present composition contains a heat stabilizer from such a viewpoint that the strength at high temperatures of a molded product obtained by using the present composition will be superior. As the heat stabilizer, a copper compound is preferred.

As specific examples of the copper compound being the heat stabilizer, copper(I) oxide (cuprous oxide), copper(II) oxide (cupric oxide), copper(I) iodide and copper(II) iodide may be mentioned, and from the viewpoint of excellent stability in humid air, copper(II) oxide is particularly preferred.

In a case where the present composition contains a heat stabilizer, the content of the heat stabilizer is preferably from 0.00015 to 0.02 part by mass, more preferably from to 0.005 part by mass, particularly preferably from 0.0003 to 0.002 part by mass, to 100 parts by mass of the present copolymer in the present composition. When the content of the heat stabilizer is within the above range, even if the molded product obtained by using the present composition is used under high temperatures, the strength will be good, and coloration will be suppressed.

<Antioxidant>

It is preferred that the present composition contains an antioxidant from such a viewpoint that it is thereby possible to improve the heat resistance of a molded product obtained by using the present composition.

As specific examples of the antioxidant, a phenolic antioxidant, a phosphorous antioxidant, a sulfur antioxidant, a hindered phenol antioxidant, an amine antioxidant and a polymerized acrylate-type radical scavenger may be mentioned, and from such a viewpoint that it is possible to improve the heat resistance of the molded product more, a phenolic antioxidant is preferred.

In a case where the present composition contains an antioxidant, the content of the antioxidant is preferably from 0.00002 to 0.02 part by mass, more preferably from to 0.015 part by mass, particularly preferably from 0.0001 to 0.001 part by mass, to 100 parts by mass of the present copolymer in the present composition. When the content of the antioxidant is within the above range, the heat resistance of the molded product can be further improved.

<Other Additives>

The present composition may contain additives other than the above-described ones. As specific examples of such other additives, a resin other than the present copolymer, a colorant, a UV absorber, a filler, a cross-linking agent, a cross-linking aid and an organic peroxide, may be mentioned.

In a case where the present composition contains other additives, the content of such other additives is preferably from 0.0000001 to 70 parts by mass, more preferably from 0.0000005 to 60 parts by mass, particularly preferably from 0.000001 to 50 parts by mass, to 100 parts by mass of the present copolymer in the present composition.

As the method for producing the present composition, a method of melt-kneading the present copolymer and the above components to be used as the case requires, by a known method, may be mentioned.

[Molded Product]

The molded product of the present invention is obtained by molding the above-described present copolymer or the above-described present composition. Since the present molded product contains the present copolymer, it is excellent in engine oil resistance. Further, since the melting point of the present copolymer is high, the present molded product is excellent also in heat resistance.

As specific examples of the molding method, injection molding, extrusion molding, blow molding, press molding, rotational molding and electrostatic coating may be mentioned.

The present molded product is suitably used as electrical wire sheathing material for various types of equipment. Specifically, electrical wire sheathing material for electrical equipment such as robots, electric motors, generators and transformers, electrical wire sheathing material for household electrical equipment, electrical wire sheathing material for telecommunication transmission equipment such as telephones and radios, electrical wire sheathing material for electronic equipment such as computers, data communication equipment and terminal equipment, electrical wire sheathing material for railroad vehicles, electrical wire sheathing material for automobiles, electrical wire sheathing material for aircraft, electrical wire sheathing material for ships, and electrical wire sheathing material for system components such as buildings, plant trunk lines, power plants, petrochemical plants and steelmaking plants, may be mentioned. Among these, the present molded product is particularly suitable for electrical wire sheathing material for automobiles and other vehicles that use engine oil, from such a viewpoint that it is excellent in resistance to engine oil.

Further, in addition to electrical wire sheathing material, the present molded product can be used also for tubes, sheets, films, filaments, pump casings, fittings, packing, linings, coatings, etc.

[Coated Electrical Wire]

The coated electrical wire of the present invention (hereinafter referred to also as "the present coated electrical wire") has a conductor and a coating layer disposed on the surface of the above conductor and formed from the above-described copolymer or the above-described composition.

Since the present coated electrical wire contains the present copolymer, it is excellent in engine oil resistance. Further, since the melting point of the present copolymer is high, the present coated electrical wire is excellent also in heat resistance.

As the material to constitute the conductor, copper, aluminum and their alloys may be mentioned, and copper is preferred. The conductor may be plated with tin, silver or the like. The conductor is preferably a core wire.

The cross-sectional diameter of the conductor is preferably from 200 μm to 18.0 mm.

The thickness of the coating layer is preferably from 100 μm to 2.0 mm.

The cross-sectional diameter of the coated electrical wire is preferably from 400 μm to 22.0 mm.

As a specific example of the production method for the present coated electrical wire, a method of letting the melted present copolymer or present composition be attached to the surface of the conductor and forming a coating layer formed from the present copolymer or present composition on the surface of the conductor, may be mentioned.

Specific examples of applications of the coated electrical wire are as described in the section for the above present molded product, and therefore their description is omitted.

EXAMPLES

In the following, the present invention will be described in detail with reference to Examples. Ex. 1 to Ex. 3 and Ex. 6 are Examples of the present invention, and Ex. 4 to Ex. 5 and Ex. 7 and Ex. 8 are Comparative Examples. However, the present invention is not limited to these Examples.

[Proportions of the Respective Units]

The contents (mol %) of the respective units in the copolymer were calculated by $^{19}$F-NMR measurements. However, the content of E units in the copolymer was calculated by $^{1}$H and $^{13}$C-NMR measurements.

[Crystal Lamella Thickness]

The crystal lamella thickness (nm) of the copolymer was calculated from the profile obtained by the small-angle X-ray scattering method (SAXS method).

Specifically, measurements by the SAXS method were conducted by beam line BL8S3 at the Aichi Synchrotron Radiation Center. Using an X-ray wavelength of 1.5 Å, a camera length of 1131.07 mm, and an exposure time of 60 seconds, as the measurement conditions, as the detector, R-AXIS was used. The data obtained by the two-dimensional detector was converted to one-dimensional by circular averaging. The obtained one-dimensional SAXS profile was subjected to air-cell scattering correction to obtain the SAXS profile of the copolymer. The SAXS profile of the copolymer in the region of 0.15 $nm^{-1}$<q (scattering vector)<1.5 $nm^{-1}$ was converted to a one-dimensional electron density correlation function, and from the one-dimensional electron density correlation function profile, the crystal lamella thickness was obtained.

Here, the conversion to a one-dimensional electron density correlation function was conducted in accordance with the method described in Fujimori, A. et al. J. Polym. Sci. Part B: Polym. Phys. 2015, 53, 1674-1690.

[Melting Point]

The melting point (° C.) of the copolymer was determined from the endothermic peak when the copolymer was heated to raise the temperature to 300° C. at 10° C./min under an air atmosphere by using a scanning differential thermal analyzer (product name "DSC7020", manufactured by Hitachi High-Tech Science Corporation).

[M Value]

Using the melt of each copolymer, the M value of each copolymer was calculated by the above formula (2-1) based on the chart obtained by 400 MHz $^{19}$F-NMR measurements.

The $^{19}$F-NMR measurements were conducted under the following measurement conditions.

Measuring device: "AVANCE III 400" manufactured by Bruker

[Melt Flow Rate (MFR)]

The mass (g) of the copolymer flowing out of an orifice of 2 mm in diameter and 8 mm in length in 10 minutes under conditions of a temperature of 297° C. and a load of 49 N, was measured in accordance with ASTM D3159 by using a melt indexer (manufactured by Technol Seven Co., Ltd.) and adopted as MFR (g/10 min).

[Evaluation Tests]

An apparatus for producing a coated electrical wire comprising an extruder (MS30-25 manufactured by IKG) equipped with a feeder for unrolling a core wire, and a screw (manufactured by IKG, full flight, L/D=24, diameter 30 mm) for melt-kneading the composition containing the copolymer, a take-up machine (manufactured by Hijiri Manufacturing Ltd.) for pulling out the coated electrical wire, and a winding-up machine (manufactured by Hijiri Manufacturing Ltd.) for winding the coated electrical wire, was prepared.

The composition supplied to the extruder was melt-kneaded under a temperature condition of from 280 to 320° C., and the melted composition was extruded from the nozzle of the extruder and adhered to the surface of the core wire (product name "TA copper core 37/0.26", manufactured by Yasuda Kogyo Co., Ltd.) let out from the feeder. The composition adhered to the surface of the core wire was cooled and solidified to obtain a coated electrical wire having a coating layer formed on the surface of the core wire (cross-sectional diameter of the coated electrical wire: 2.8 mm±0.02 mm). Here, the pull speed of the coated electrical wire was adjusted to be 10 m/min.

Using the obtained coated electrical wire, the following evaluation tests were conducted.

<Engine Oil Resistance>

After cutting the coated electrical wire into a 600 mm length, the coating layer was peeled off in a length of 25 mm at both ends of the coated electrical wire. The core wires of the peeled portions were wrapped around each other to obtain a teardrop-shaped coated electrical wire (sample for evaluation).

Thereafter, in oil (IRM902) manufactured by Japan Sun Oil Company, Ltd., the sample for evaluation was dipped for 10 seconds and then taken out, and the oil was dripped off, whereupon it was hanged in an oven heated to 200° C. and left to stand still. After expiration of 240 hours, the sample for evaluation was once taken out, and the presence or absence of cracks in the coating layer of the sample for evaluation was visually confirmed. One with no cracks was again dipped in oil (IRM902) for 10 seconds and then taken out, and after dripping oil off, it was hanged in an oven heated to 200° C. and left to stand still. The same operation was repeated two more times, and after expiration of a total of 1,000 hours since the sample for evaluation was first left to stand still in the oven, the sample for evaluation was taken out from the oven. The sample was wrapped around a 30 mm-diameter mandrel five or more times with a 5 kgf load applied, and the presence or absence of cracks in the coating layer of the sample for evaluation was visually judged.

<Abrasion Resistance>

After cutting the coated electrical wire obtained in the same manner as the evaluation of engine oil resistance, into a 2 m length, a scrape abrasion test was conducted by a test method in accordance with ISO 6722-1 using a "magnet wire abrasion tester (reciprocating type)" manufactured by Yasuda Seiki.

Specifically, the test was conducted under the following conditions: needle diameter: 0.45±0.01 mm, needle material: SUS316 (in accordance with JIS K-G7602), wear distance: 1.55±1 mm, wear rate: 55±5 times/min, load: 7 N, test environment: 23±1° C.

The abrasion resistance is expressed as the number of needle reciprocations required for the core wire to be exposed from the coating layer by the reciprocating motion of the needle. The higher the abrasion resistance (number of needle reciprocations), the better the abrasion resistance of the coating layer.

Ex. 1

<Production of Copolymer 1>

After replacing a 21.3 L stainless steel polymerization tank with nitrogen, the pressure was reduced to −0.1 MPaG, and C6H (21,050 g), $CH_3OH$ (206.8 g), $CH_2{=}CH(CF_2)_4F$ (290 g), tetrafluoroethylene (TFE) (3,393 g), and ethylene (E) (155 g) were charged.

Next, while stirring the solution in the polymerization tank, the temperature was raised to 50° C. (polymerization temperature), and a solution of IPP dissolved in $C_6H$ (2 mass %, 200 mL) was injected into the polymerization tank. When the pressure in the polymerization tank began to drop, a mixed monomer of TFE/E=54/46 (molar ratio) was added to keep the internal pressure in the tank at 1.5 MPaG, to let polymerization proceed. Every time when 50 g of the mixed monomer was injected, a $CH_2{=}CH(CF_2)_4F$ solution (76 mass %, 5 mL) was added to the polymerization tank. When the continuous charging of the mixed monomer reached 1,718 g, the polymerization tank was cooled to room temperature, and the gas in the tank was released and recovered. The polymerization time was 220 minutes. The solvent was removed, followed by drying at 150° C. to obtain a powder of copolymer 1.

Here, C6H means 1,1,1,2,2,3,3,4,4,5,5,6,6-tridecafluorohexane, and IPP means diisopropyl peroxydicarbonate.

<Production of Composition 1>

Copolymer 1 (100 parts by mass), copper(II) oxide (0.00065 part by mass), and Sumilizer GP (0.02 part by mass) were mixed and melt extruded by a 30 mm diameter extruder (MS30-25, manufactured by IKG) under conditions of cylinder temperature: 260 to 300° C., die temperature: 300° C., and screw rotational speed: 60 rpm, to obtain a molded product in a strand form, whereupon it was cut by a pelletizer to obtain composition 1 in a pellet form.

Ex. 2

Copolymer 2 in Ex. 2 was obtained in the same manner as in Ex. 1, except that the charging amounts of the respective components were adjusted so that the composition ratios of the copolymer became the values listed in Table 1. $CH_2{=}CH(CF_2)_6F$ was used as compound A.

Composition 2 in a pellet form in Ex. 2 was obtained in the same manner as in Ex. 1, except that the obtained copolymer was used.

Ex. 3

Copolymer 3 in Ex. 3 was obtained in the same manner as in Ex. 1, except that the charging amounts of the respective components were adjusted so that the composition ratios of the copolymer became the values listed in Table 1. $CH_2{=}CH(CF_2)_2F$ was used as compound A.

Composition 3 in a pellet form in Ex. 3 was obtained in the same manner as in Ex. 1, except that the obtained copolymer was used, and Sumilizer GP was not used.

Ex. 4

Copolymer 4 in Ex. 4 was obtained in the same manner as in Ex. 1, except that the charging amounts of the respective components were adjusted so that the composition ratio of the copolymer became the values listed in Table 1, and the polymerization temperature was changed from 50° C. to 66° C. $CH_2{=}CF(CF_2)_3H$ was used as compound A.

Composition 4 in a pellet form in Ex. 4 was obtained in the same manner as in Ex. 1, except that copolymer 4 was used.

Ex. 5

Copolymer 5 in Ex. 5 was obtained in the same manner as in Ex. 1, except that the charging amounts of the respective components were adjusted so that the composition ratio of the copolymer became the values listed in Table 1. $CF_2{=}CF(OCF_2)_3F$ was used as compound B.

Composition 5 in a pellet form in Ex. 5 was obtained in the same manner as in Ex. 1, except that copolymer 5 was used.

Table 1 shows the evaluation results using the compositions of from Ex. 1 to Ex. 5.

TABLE 1

| | | Type of composition | Ex. 1<br>1 | Ex. 2<br>2 | Ex. 3<br>3 | Ex. 4<br>4 | Ex. 5<br>5 |
|---|---|---|---|---|---|---|---|
| Copolymer | | Type of copolymer | 1 | 2 | 3 | 4 | 5 |
| | Composition | TFE units (mol %) | 51.4 | 51.2 | 51.6 | 52.8 | 53.0 |
| | | E units (mol %) | 45.6 | 46.0 | 45.6 | 45.0 | 45.0 |
| | | A units or B units (mol %) | 3.0 | 2.8 | 2.8 | 2.2 | 2.0 |
| | Physical properties | Crystal lamella thickness (nm) | 3.8 | 3.8 | 3.8 | 4.7 | 5 |
| | | Melting point (° C.) | 249 | 251 | 250 | 250 | 257 |
| | | M value | 0.15 | 0.15 | 0.16 | 0.18 | 0.16 |
| | | MFR (g/min) | 41 | 27 | 17 | 21 | 20 |
| Evaluation results | Engine oil resistance (Presence or absence of cracking) | 240 hr | Absent | Absent | Absent | Absent | Absent |
| | | 480 hr | Absent | Absent | Absent | Absent | Present |
| | | 720 hr | Absent | Absent | Absent | Present | — |
| | | 1000 hr | Absent | Absent | Absent | — | — |
| | Abrasion resistance | Number of reciprocations of needle (times) | 4638 | 4638 | 8012 | 6156 | 6689 |

As shown in Table 1, it was confirmed that by using copolymers containing E units, TFE units and A units, of which the crystal lamella thickness was at most 4.0 nm and the melting point was at least 245° C., it was possible to obtain coated electrical wires excellent in engine oil resistance (Ex. 1 to 3).

Ex. 6

Copolymer 6 in Ex. 6 was obtained in the same manner as in Ex. 1, except that the charging amounts of the respective components were adjusted so that the composition ratio of the copolymer became the values listed in Table 2. $CF_2{=}CF(OCF_2)_3F$ was used as compound B.

Composition 6 in a pellet form was obtained in the same manner as in Ex. 1, except that the obtained copolymer was used.

Ex. 7

Copolymer 7 in Ex. 7 was obtained in the same manner as in Ex. 1, except that the charging amounts of the respective components were adjusted so that the composition ratio of the copolymer became the values listed in Table 2. As compound A, $CH_2{=}CH(CF_2)_4F$ was used in the same manner as in Ex. 1.

Composition 7 in a pellet form in Ex. 7 was obtained in the same manner as in Ex. 1, except that the obtained copolymer was used.

Ex. 8

Copolymer 8 in Ex. 8 was obtained in the same manner as in Ex. 1, except that the charging amounts of the respective components were adjusted so that the composition ratio of the copolymer became the values listed in Table 2. As compound A, $CH_2{=}CH(CF_2)_4F$ was used in the same manner as in Ex. 1.

Composition 8 in a pellet form in Ex. 8 was obtained in the same manner as in Ex. 1, except that the obtained copolymer was used.

Table 2 shows the evaluation results using the compositions of from Ex. 6 to Ex. 8.

TABLE 2

| Type of composition | | | Ex. 6<br>6 | Ex. 7<br>7 | Ex. 8<br>8 |
|---|---|---|---|---|---|
| Copolymer | Type of copolymer | | 6 | 7 | 8 |
| | Composition | TFE units (mol %) | 52.0 | 48.2 | 52.4 |
| | | E units (mol %) | 45.0 | 49.1 | 45.5 |
| | | A units or B units (mol %) | 3.0 | 2.7 | 2.1 |
| | Physical properties | Crystal lamella thickness (nm) | 3.8 | 4.5 | 5 |
| | | Melting point (° C.) | 250 | 254 | 251 |
| | | M value | 0.15 | 0.1 | 0.19 |
| | | MFR (g/min) | 40 | 7.9 | 28.5 |
| Evaluation results | Engine oil resistance (Presence or absence of cracking) | 240 hr | Absent | Absent | Absent |
| | | 480 hr | Absent | Present | Present |
| | | 720 hr | Absent | — | — |
| | | 1000 hr | Present | — | — |

This application is a continuation of PCT Application No. PCT/JP2022/005103, filed on Feb. 9, 2022, which is based upon and claims the benefit of priority from Japanese Patent Application No. 2021-020979 filed on Feb. 12, 2021. The contents of those applications are incorporated herein by reference in their entireties.

What is claimed is:

1. A copolymer comprising units based on ethylene, units based on tetrafluoroethylene, and units based on a compound represented by formula (A) or a compound represented by formula (B), wherein a crystal lamella thickness obtained by a small angle X-ray scattering (SAXS) method is at most 4.0 nm, and a melting point is at least 245° C.:

$$CH_2{=}CX(CF_2)_nY \qquad \text{Formula (A)}$$

$$CF_2{=}CF{-}O{-}C_3F_7 \qquad \text{Formula (B)}$$

in formula (A), X and Y are each independently a hydrogen atom or a fluorine atom, and n is an integer of from 2 to 6.

2. The copolymer according to claim 1, wherein the M value of the copolymer as determined by the following calculation method is at most 0.20:

Calculation method: a M value is a value calculated by the following formula (1) based on a spectrum obtained by 400 MHz $^{19}F$-NMR measurement using a melt of the copolymer:

$$M\ value = C1/B1 \qquad \text{Formula (1)}$$

B1: Integral value of peaks observed in a range of chemical shift of from −100 to −115 ppm, C1: Integral value of peaks observed in a range of chemical shift of from −118.5 to −122 ppm, the chemical shifts in said B1 and said C1 are chemical shifts observed when the chemical shift of a peak of $CF_2$ at a position where, at a portion where two consecutive tetrafluoroethylene-based units of the copolymer are continuous, one tetrafluoroethylene-based unit and the other tetrafluoroethylene-based unit are directly bonded, is set to be −120 ppm, wherein said B1 does not include an integral value of peaks observed in the range of chemical shift of from −100 to −115 ppm derived from the compound represented by formula (A) and the compound represented by formula (B), and said C1 does not include an integral value of peaks observed in the range of chemical shift of from −118.5 to −122 ppm derived from the compound represented by formula (A) and the compound represented by formula (B).

3. The copolymer according to claim 1, wherein a content of the units based on tetrafluoroethylene is from 40 to 65 mol % to all units contained in the copolymer.

4. The copolymer according to claim 1, wherein a content of the units based on ethylene is from 35 to 60 mol % to all units contained in the copolymer.

5. The copolymer according to claim 1, wherein the copolymer contains units based on ethylene, units based on tetrafluoroethylene, and units based on the compound represented by formula (A).

6. The copolymer according to claim 1, wherein the copolymer contains units based on the compound represented by formula (A), and a content of the units based on the compound represented by formula (A) is from 1 to 5 mol % to all units contained in the copolymer.

7. The copolymer according to claim 1, wherein the copolymer contains units based on the compound represented by formula (B), and a content of the units based on the compound represented by formula (B) is from 1 to 5 mol % to all units contained in the copolymer.

8. The copolymer according to claim 1, wherein a melt flow rate of the copolymer, measured under conditions of a temperature of 297° C. and a load of 49 N in accordance with ASTM D3159, is from 15 to 60 g/10 min.

9. A composition comprising the copolymer according to claim 1 and an additive.

10. The composition according to claim 9, which contains a heat stabilizer as the additive.

11. The composition according to claim 10, wherein the heat stabilizer is a copper compound.

12. The composition according to claim 9, which contains an antioxidant as the additive.

13. A molded product obtained by molding the copolymer according to claim 1.

14. A molded product obtained by molding the composition according to claim 9.

15. A coated electrical wire comprising a conductor and a coating layer disposed on a surface of the conductor and formed from the copolymer according to claim 1.

16. A coated electrical wire comprising a conductor and a coating layer disposed on a surface of the conductor and formed from the composition according to claim 9.

* * * * *